Oct. 5, 1965
R. K. DAVIS ETAL
3,210,759
IDENTIFICATION INTERROGATION SYSTEM
Filed Oct. 4, 1963
12 Sheets-Sheet 1
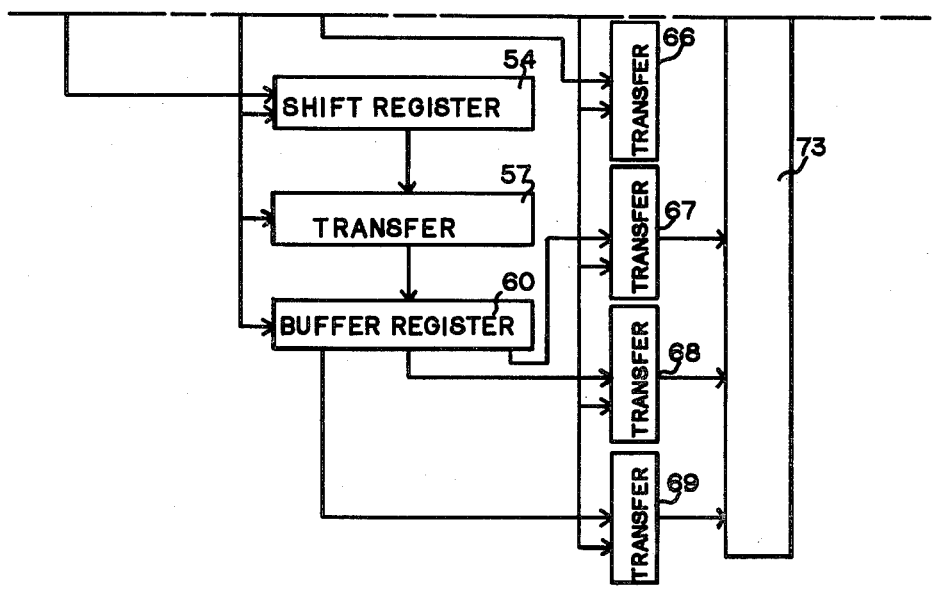
FIG. IC
FIG. I Oct. 5, 1965   R. K. DAVIS ETAL   3,210,759
IDENTIFICATION INTERROGATION SYSTEM
Filed Oct. 4, 1963   12 Sheets-Sheet 2
FIG. IA
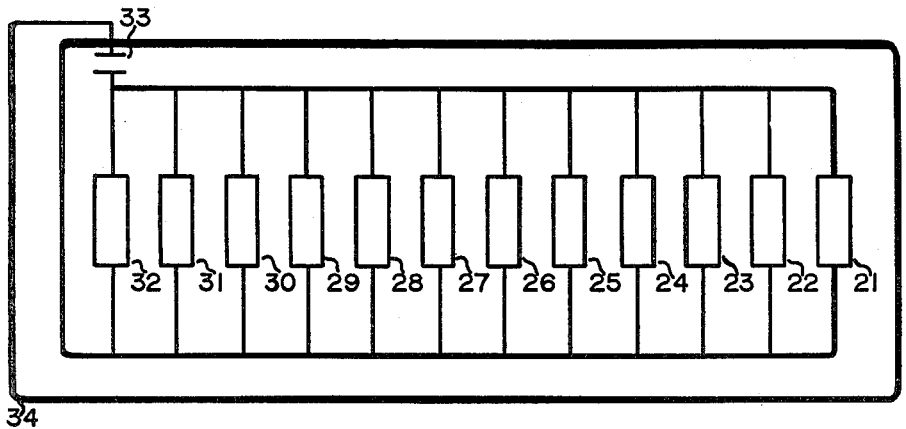
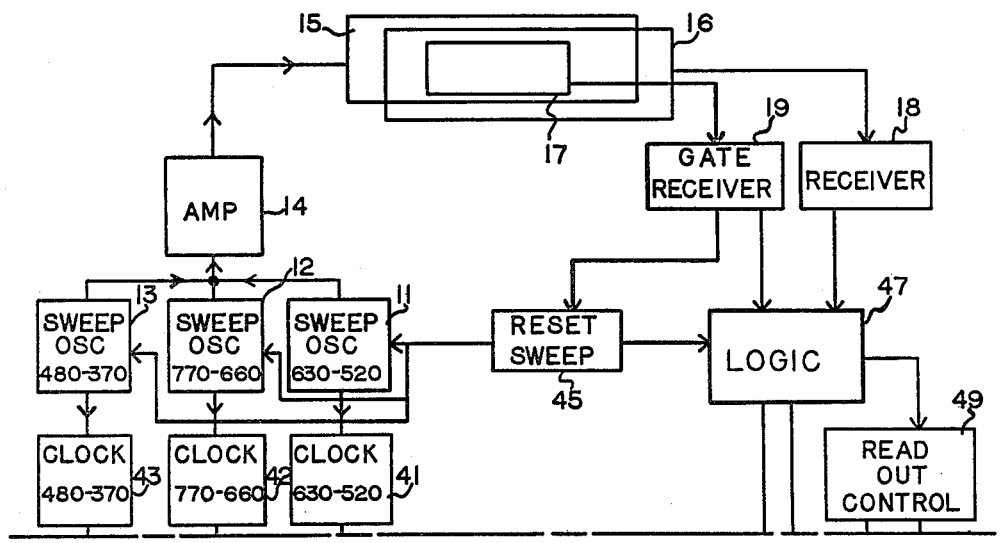
INVENTOR.
RICHARD K. DAVIS
FRANCIS M. BAILEY
BY
*J. T. Comfort*
ATTORNEY

| SET | A |
| RECEIVER | B |
| SHIFT | C |
| CLOCK | D |

Oct. 5, 1965   R. K. DAVIS ETAL   3,210,759
IDENTIFICATION INTERROGATION SYSTEM
Filed Oct. 4, 1963   12 Sheets-Sheet 5
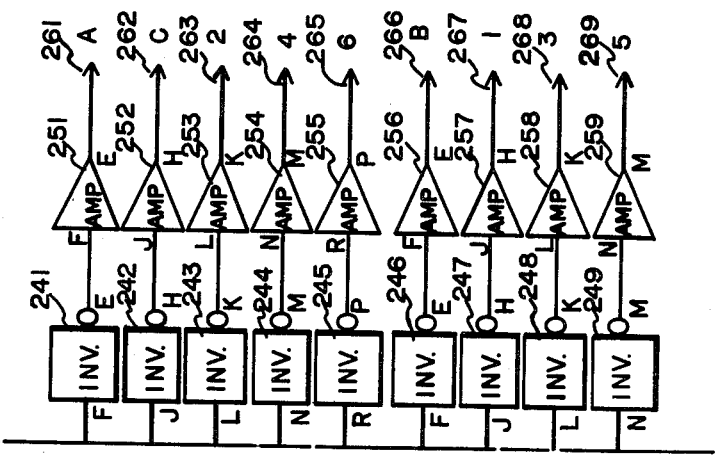

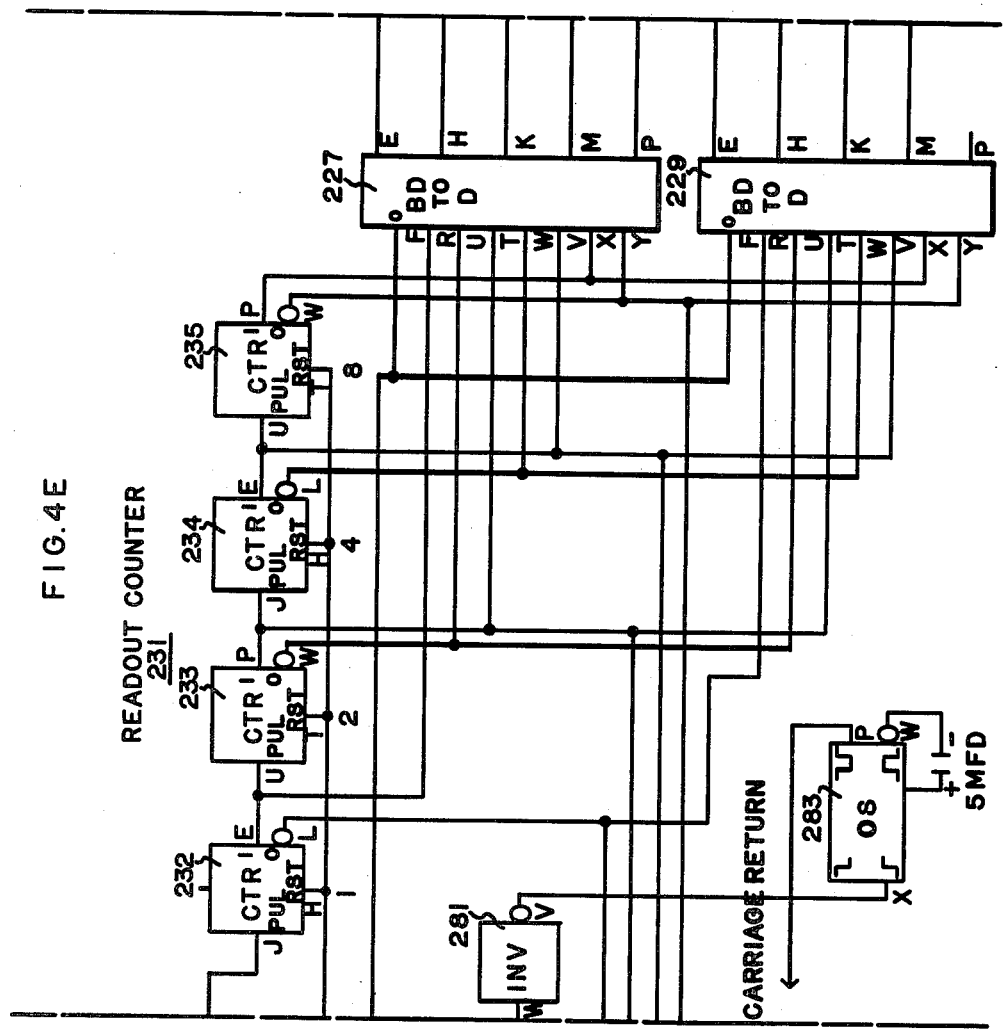

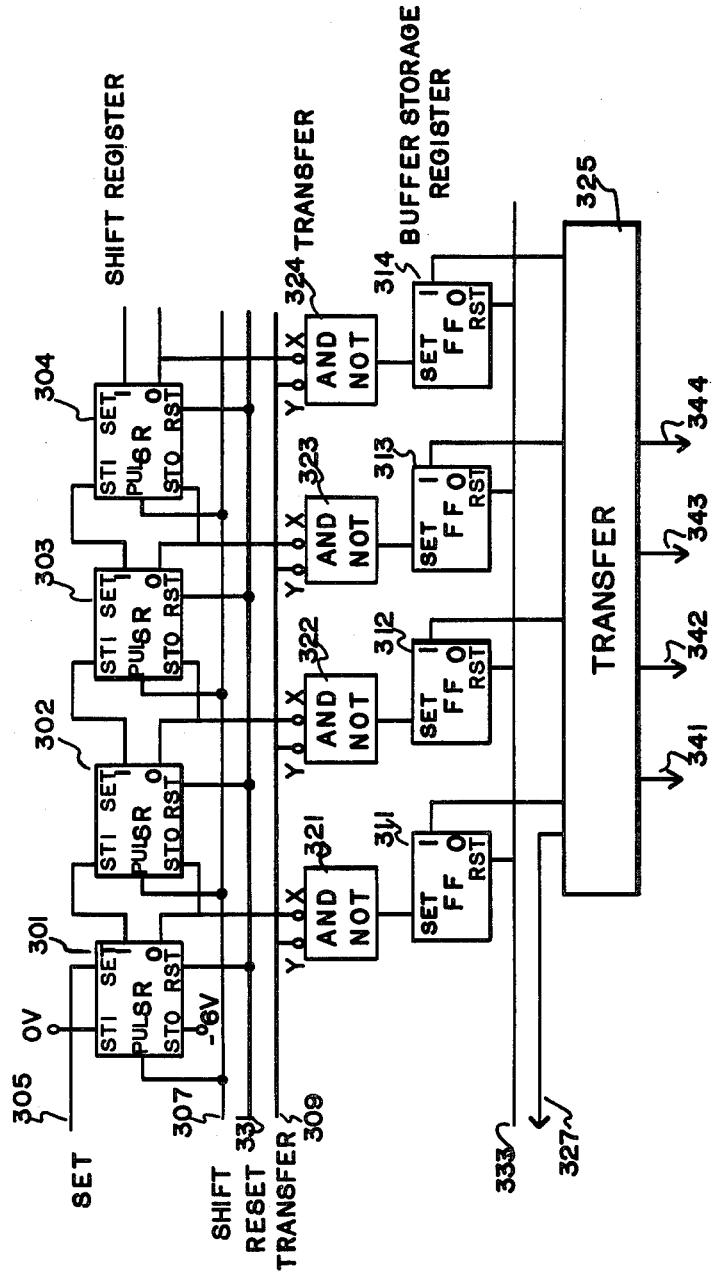

FIG.6
AMPLIFIER
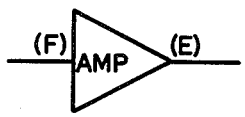
FIG.6A
LOGIC AMPLIFIER
FIG.6B
AND NOT
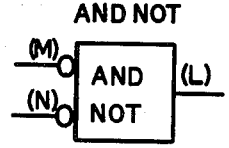
FIG.6C
COUNTER
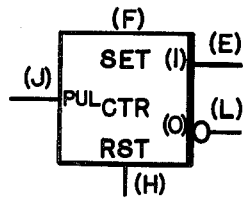
FIG.6D
INVERTER
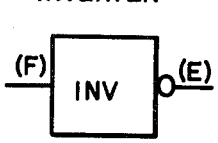
FIG.6E
INVERTING OR
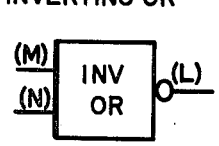
FIG.6F
ONE SHOT
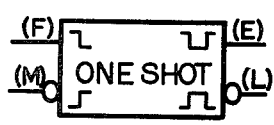
FIG.6G
OR CIRCUIT
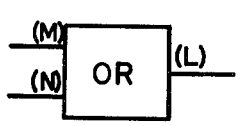
FIG.6H
SHIFT REGISTER
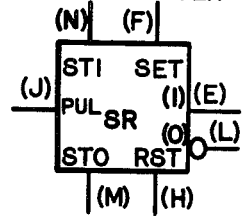
FIG.6I
FLIP FLOP
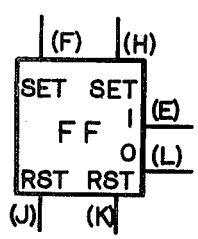
FIG.6J
TIME DELAY
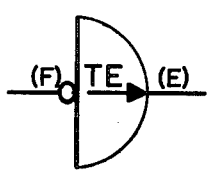
FIG.6K
RELAY COIL
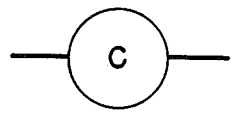
FIG.6L United States Patent Office 3,210,759
Patented Oct. 5, 1965

3,210,759
IDENTIFICATION INTERROGATION SYSTEM
Richard K. Davis and Francis M. Bailey, Roanoke, Va., assignors to General Electric Company, a corporation of New York
Filed Oct. 4, 1963, Ser. No. 314,036
7 Claims. (Cl. 343—6.5)

This invention relates to a system for identifying objects passing, or being passed by, an interrogation device. More specifically this invention relates to a system for identifying objects, each object having a unique identification device with a provision for assuring that the proper identification is obtained from the identification device.

This invention is particularly directed to that type of identification system where the unique identification device associated with each object uses piezoelectric elements, each having a different preselected frequency response, whereby identification of the object is made by the piezoelectric elements connected in the unique identification device.

In such an identification system, the piezoelectric elements in each identification device have different preselected frequency responses. Signals are transmitted over a preselected frequency range from a transmitting antenna. Signals at the same frequencies of the piezoelectric elements connected in the identification device are reflected by the identification device, transmitted to a receiving antenna, and decoded to indicate the identity of the object as indicated by the identification device.

The piezoelectric element and assigned frequencies are usually about 10 kc. apart. Each different frequency represents a binary bit, with the presence of a piezoelectric element representing a binary one, and the absence representing a binary zero. The number of different bits necessary in an object identification system depends on the number of objects to be identified. The more objects to be identified the more binary bits that are needed. For ease in coding the identification devices, a binary coded decimal code is desirable. When very many different objects are to be identified, as many as 36 binary bits or more may be required. This means that there must be 36 different frequency responses, with a transmitted signal sweeping a frequency range from 370 to 770 kc.

To identify a specific object according to the identification device, or signal repeating device, associated with each object, the whole frequency range from 370 to 770 kc. must be swept. The sweeping of a frequency range this wide requires about 36 milliseconds. This makes it difficult to read an identification number of 36 binary bits when the object is traveling at a high rate of speed.

It is possible to lengthen the antennas, but this cuts down on the signal strength.

It is therefore an object of this invention to provide a new and improved object identification system.

Another object of this invention is to provide a new and improved object identification system capable of handling a large identification number.

Yet another object of this invention is to provide a new and improved identification system capable of identifying objects traveling at high speeds.

It is another object of this invention to provide a new and improved identification system which can identify large numbers of objects traveling at high speeds.

Very briefly then, this invention consists of a system having a signal transmitting device, transmitting a signal with a plurality of variable signals, each having a different frequency range, corresponding receiving devices suitably arranged to cooperate with the transmitting device, a selective signal repeating device carried by the objects to be identified, and logic circuits for correlating the identification of an object with the transmitted signal. Piezoelectric elements, each of a different preselected frequency response, are included in the signal repeating device.

The system functions to transmit a plurality of variable signals, each having a different frequency range, from the transmitters to the signal repeating device; each of the signal repeating devices being arranged to repeat only those signals having frequencies associated with its identity to the receiving devices from which final identification is resolved by the logic circuits. The transmitters simultaneously transmit signals of different frequency ranges covering the frequency range of the signal repeating devices.

This invention is set forth with particularity in the appended claims. The principles and characteristics of the invention, as well as other objects and advantages are revealed and discussed through the medium of the illustrative embodiments appearing in the specification and drawings which follow.

In the drawings:

FIG. 1 shows how to put FIGS. 1a–c together.

FIGS. 1a–c is a block diagram of an identification system constructed in accordance with the principles of this invention.

FIG. 2 shows the timing diagram of the signals controlling the operation of the identification system.

FIG. 3 shows the frequencies used in the identification system.

FIGS. 4a through 4f, when put together as shown in FIG. 4, is a circuit diagram of an embodiment of this invention.

Figure 1B:
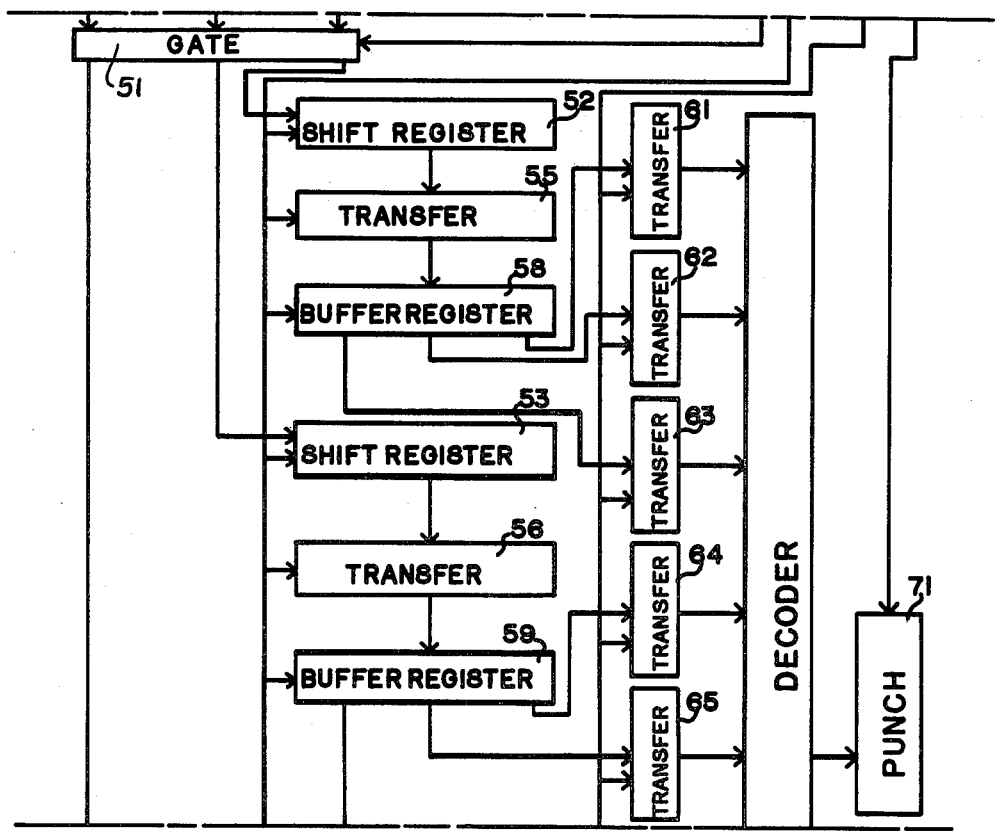
Figure 4A:
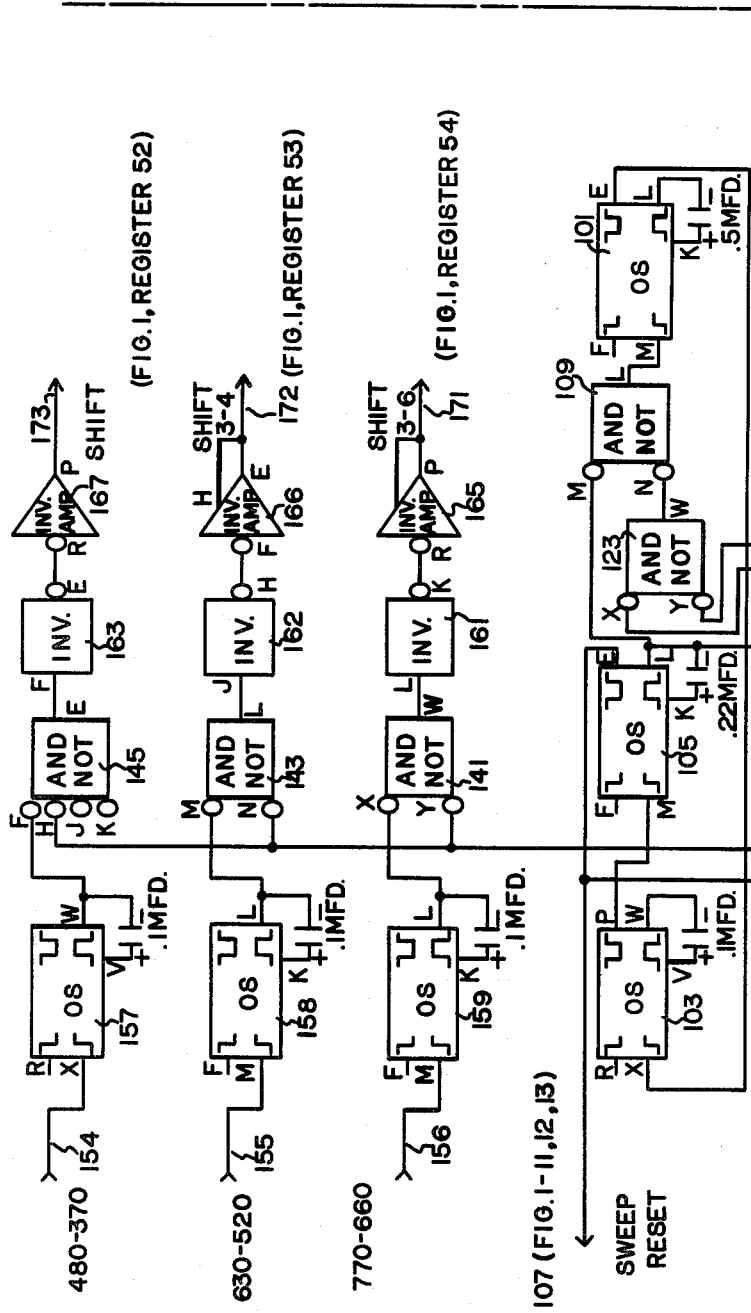
FIG. 4 shows how to put FIGS. 4a through 4f together.
Figure 4B:
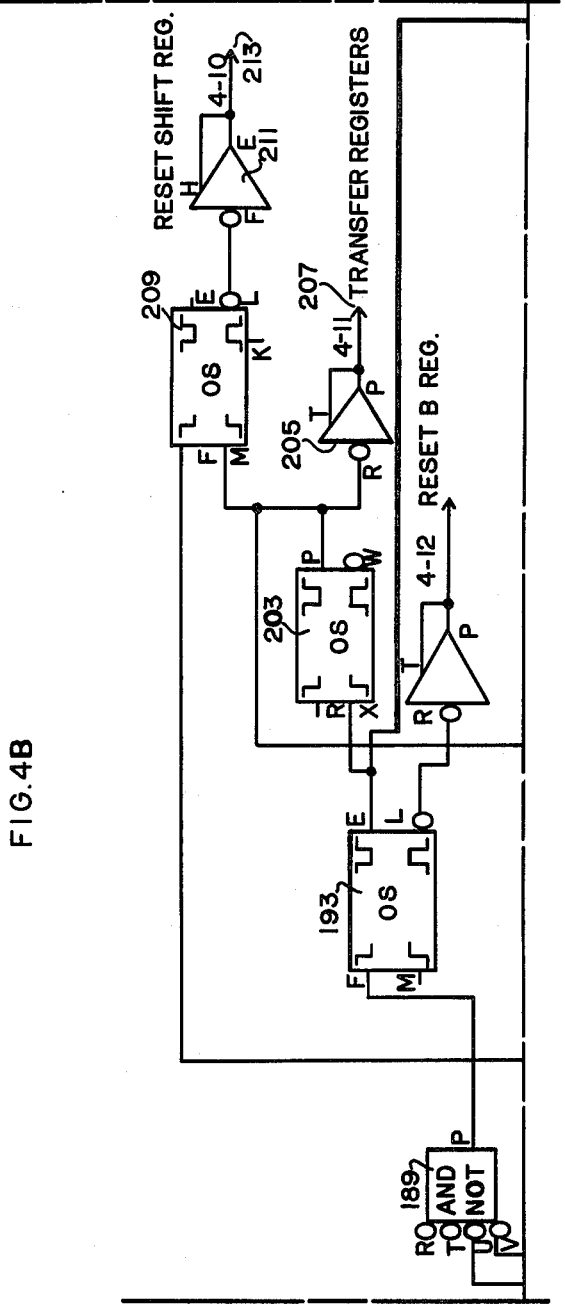
Figure 4C:
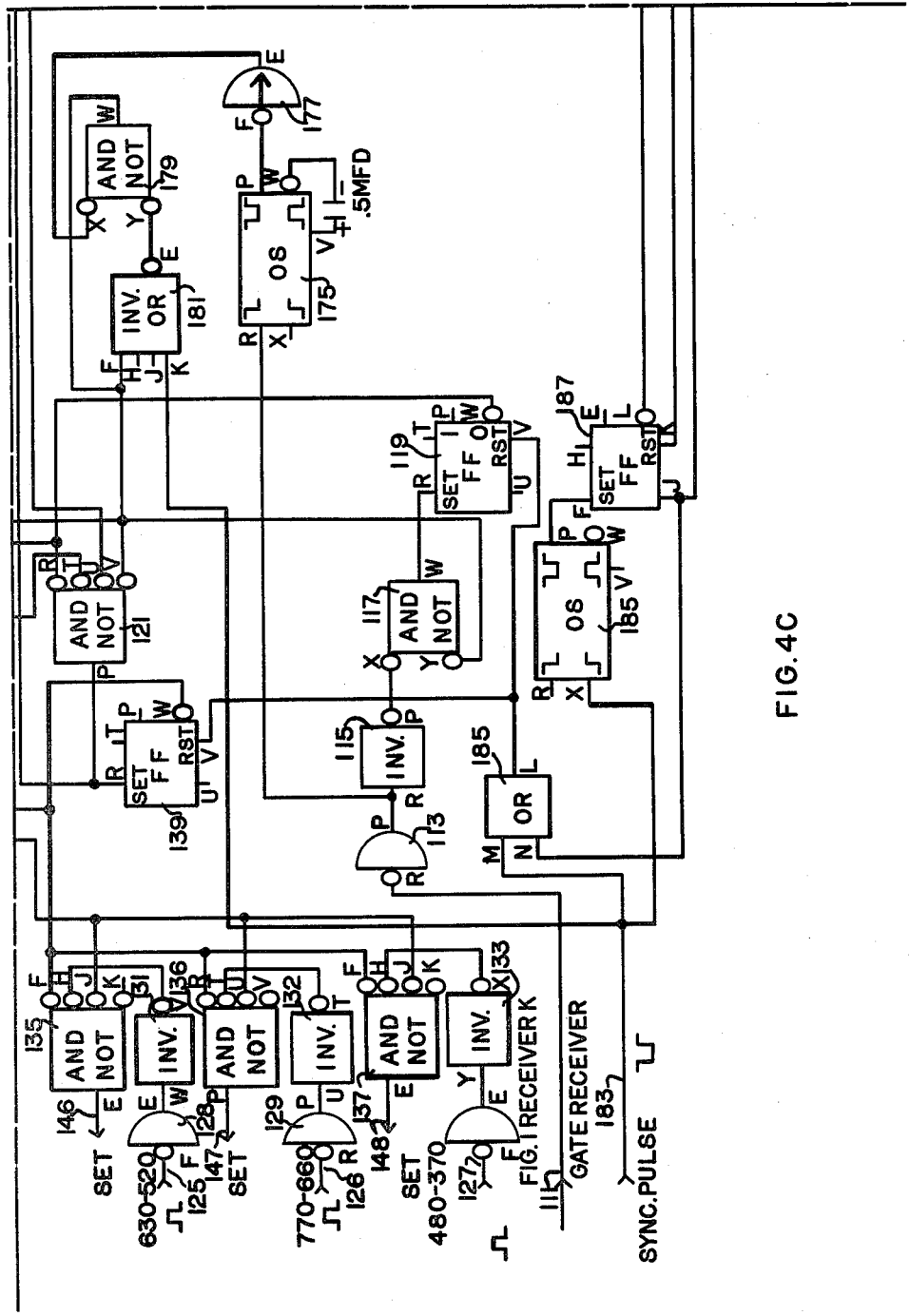
Figure 4D:
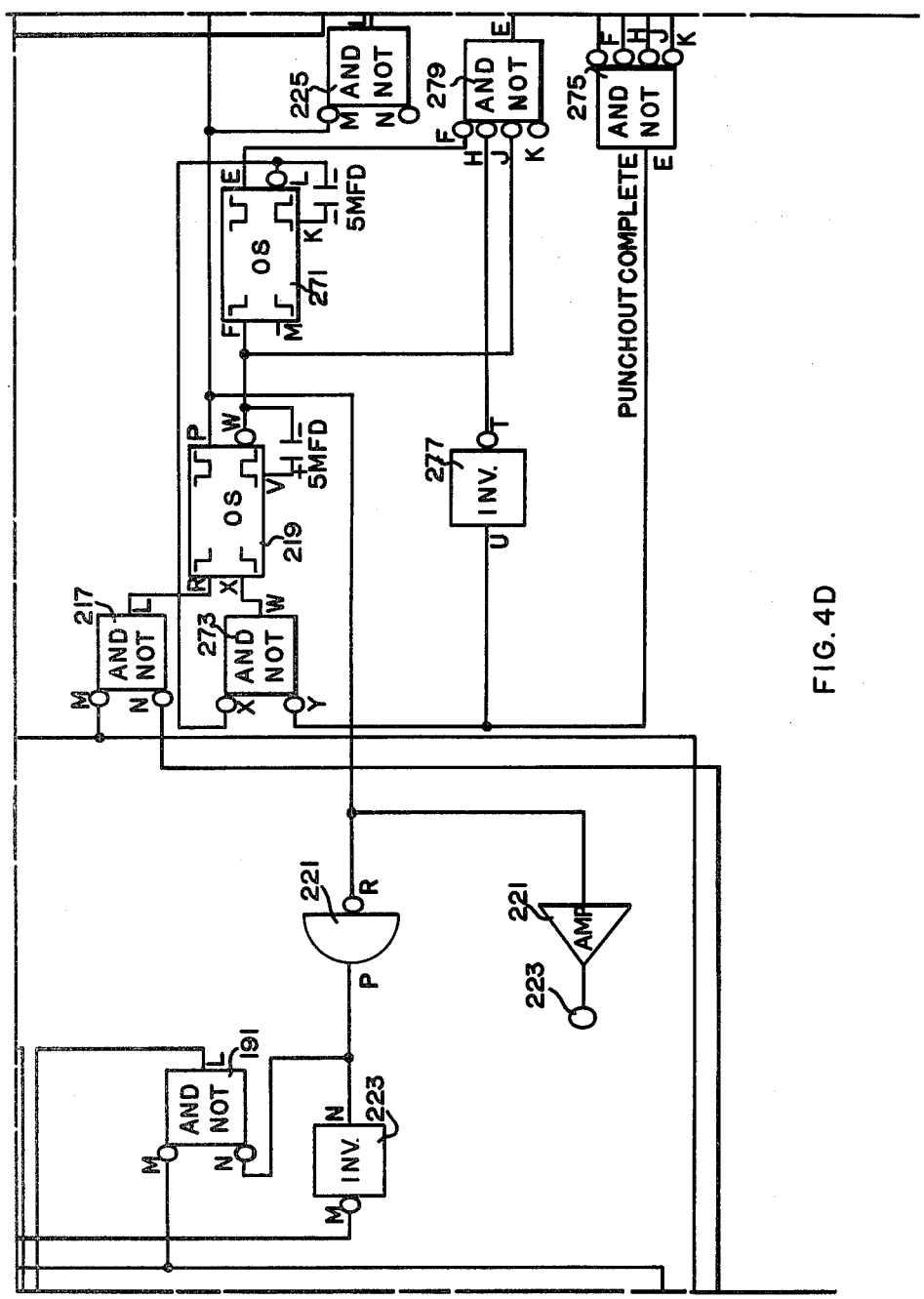

FIG. 5 is a circuit diagram of the shift register and associated circuits shown in block form in FIG. 1.

FIG. 6 shows the symbols for the circuits as blocks in FIGS. 4a through 4f and FIG. 5.

Referring now to FIG. 1, sweep oscillator 11 sweeps over the frequencies from 520 kc. to 630 kc. Sweep oscillator 12 sweeps over the frequencies from 660 kc. to 770 kc. Sweep oscillator 13 sweeps over the frequencies from 370 kc. to 480 kc. Amplifier 14 amplifies the signals produced by sweep oscillators 11–13. Transmitting antenna 15 is a closed loop antenna for transmitting the signas produced by sweep oscillators 11–13 and amplified by amplifier 14. A receiving antenna 16 is isolated from transmitting antenna 15 by overlapping the antennas in the same plane so that normally the receiving antenna 16 does not receive the signal transmitted from transmitting antenna 15. A length of 30 to 50 inches is a good length for the antennas. Receiving antenna 17 is also isolated from transmitting antenna 15 by overlapping the antennas in the same plane so that normally receiving antenna 17 does not receive the signals transmitted from transmitting antenna 15. Receiving antenna 17 is of a smaller length than transmitting and receiving antennas 15 and 16 and is ormally of a length of approximately 15 to 25 inches.

Receiver 18 receives over the frequencies from 370 through 770 kc. Gate receiver 19 receives over the frequencies from 450 to 480 kc. The digit represented by Group A of FIG. 3 must never be zero for the system to operate.

Signal repeating device 20 has twelve piezoelectric elements 21 through 32 connected in parallel through capacitor 33 to a pickup antenna 34. The piezoelectric elements 21-32 are selected from 36 different frequencies 370 kc. through 770 kc. as indicated in the timing chart in FIG. 3.

The piezoelectric elements may be small discs of lead, zirconate-titanate, or barium titanate. They may also be constructed of other materials which have a piezoelectric effect. Piezoelectric elements of lead zirconate-titanate have a resonant frequency tolerance within 0.1% from —40° C. to 85° C. The resonant frequency is estimated to change no more than ±0.2% in 10 years.

The piezoelectric elements of lead zirconate-titanate have a minimum impedance of approximately 15 ohms at resonance. At a nonresonance frequency, their impedance is of the order of 1000 ohms.

Each signal repeating device 20 therefor has a low impedance at the frequencies of the piezoelectric devices connected into the pickup antenna 34 and a high impedance at the other frequencies.

Each signal repeating device 20 is coded in binary form to represent an identification number identifying the object to which the signal repeating device 20 is connected.

Figures 2, 3:
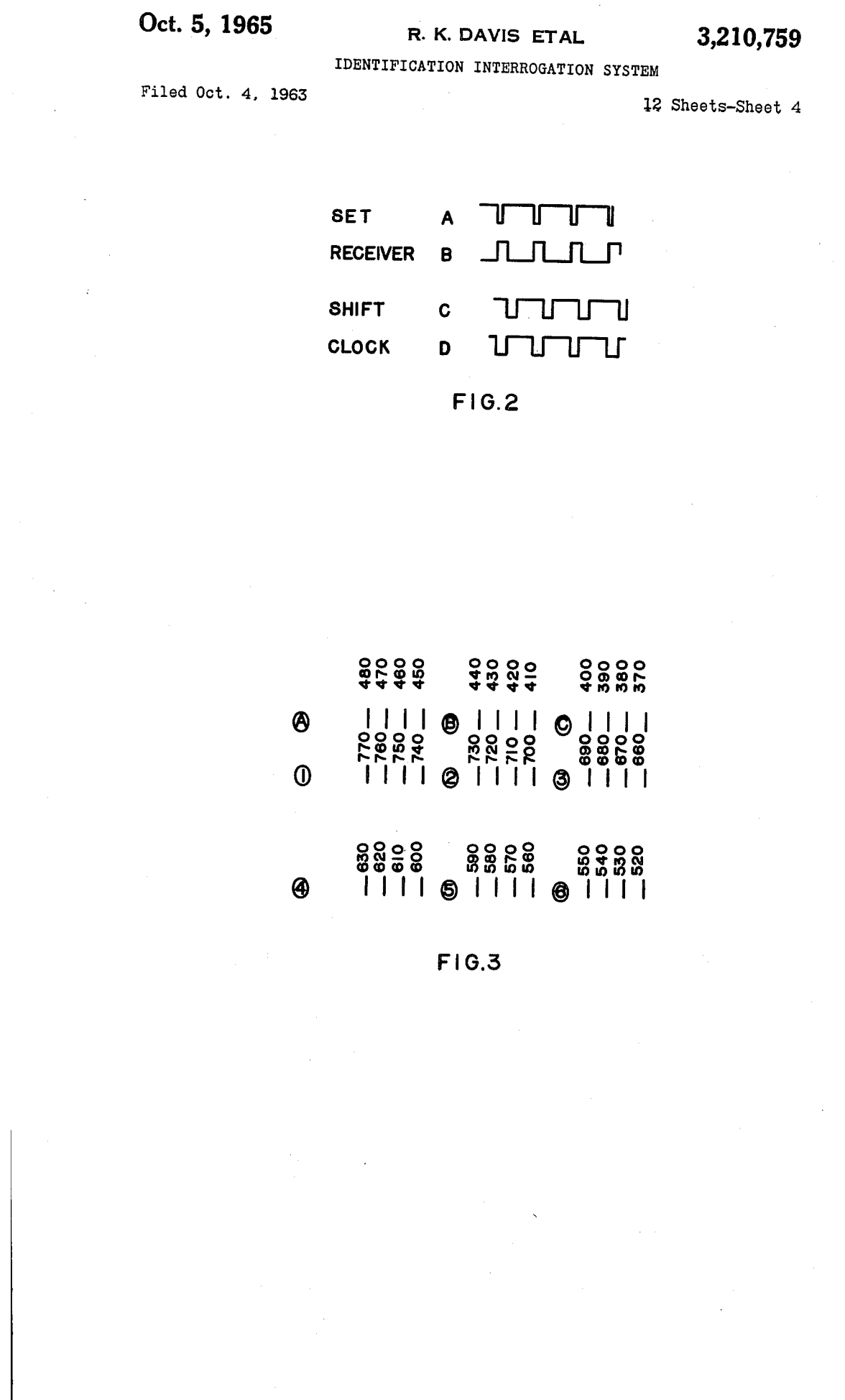

Referring now to FIG. 3. The 36 piezoelectric elements are divided into 9 different groups of four piezoelectric elements each. Each group of 4 piezoelectric elements may be coded in a 1, 2, 4, 7 code to represent one decimal number. The combination of these indicates the identity of the object to be identified.

The coding of a 1, 2, 4, 7 code to represent a decimal number is as follows. An "X" is indicated when that bit is to be a binary "one," and a "0" when that bit is to be a binary "zero" to represent the indicated decimal number.

| Binary Bit Decimal | 1 | 2 | 4 | 7 |
|---|---|---|---|---|
| 0 | 0 | 0 | 0 | 0 |
| 1 | X | 0 | 0 | 0 |
| 2 | 0 | X | 0 | 0 |
| 3 | X | X | 0 | 0 |
| 4 | 0 | 0 | X | 0 |
| 5 | X | 0 | X | 0 |
| 6 | 0 | X | X | 0 |
| 7 | 0 | 0 | 0 | X |
| 8 | X | 0 | 0 | X |
| 9 | 0 | X | 0 | X |

Each group of four piezoelectric elements may be coded into a decimal number as indicated above to make a nine digit number.

Although there are 36 binary bits and 36 different frequencies involved, only twelve piezoelectric elements are connected to each signal repeating device 20. This is because the absence of a piezoelectric element indicates a binary "zero." An examination of the 1, 2, 4, 7 coding table will quickly show that in coding the decimal numbers zero through nine, out of forty required bits, twenty-six are binary zeros, while only fourteen are binary ones. Considering that in putting together a nine digit number, there will be decimal zeros in many of the numbers, it is evident that an average twelve piezoelectric elements in each signal repeating device will suffice. A maximum of eighteen elements may be required for some numbers.

The receiver antenna 16 in FIG. 1 overlaps the transmitter antenna 15 somewhat, causing electromagnetic flux from the transmitter antenna 15 to link the receiver antenna 16 partly in one direction through the loop and partly in the other direction through the loop. The effect on receiver coil 16 is that at any instant the net flux linking the receiver coil 17 and the transmitter coil 15 is zero and no signal is produced in receiver coil 15.

Each clock 41-43 contains twelve piezoelectric elements, as indicated in the following table:

|  | Clock 41 | Clock 42 | Clock 43 |
|---|---|---|---|
| Piezoelectric Element Frequencies | 520 | 660 | 370 |
|  | 530 | 670 | 380 |
|  | 540 | 680 | 390 |
|  | 550 | 690 | 400 |
|  | 560 | 700 | 410 |
|  | 570 | 710 | 420 |
|  | 580 | 720 | 430 |
|  | 590 | 730 | 440 |
|  | 600 | 740 | 450 |
|  | 610 | 750 | 460 |
|  | 620 | 760 | 470 |
|  | 630 | 770 | 480 |

Each clock 41-43 is driven by a corresponding sweep oscillator 11-13 so that each clock 41-43 produces a signal at a predetermined time in synchronism with the production of a corresponding frequency by the corresponding sweep oscillator. Each clock contains a piezoelectric element at the frequencies shown in the above table.

The distance from the transmitter-receiver antennas to the pickup antenna 34 is largely a matter of the size of the receiver and transmitting antennas and the pickup antennas. A range of four to six inches is a good separating distance. A good rule of thumb is that the distance from the transmitter-receiver antennas to the pickup antennas is a maximum of 3/2 times the width of a square pickup antenna or 3/2 times the diameter of a round antenna. The pickup antenna should pass in a plane parallel to the plane of the transmitter-receiver antenna for maximum signal, but can pass at an angle to the antennas with a corresponding decrease in received signal.

The gate receiver 19 is connected to a reset sweep circuit 45.

Reset sweep 45 is connected to sweep oscillators 11-13, and to logic 47. Logic element 47 is connected to readout control circuit 49, gate 51, shift registers 52-54, transfer circuits 55-57 and buffer registers 58-60.

Readout control circuit 49 is connected to transfer circuits 61-69. The readout control circuit 49 is also connected to the punch 71. Transfer circuits 61-69 are connected to the decoder 73. Buffer register 58 is connected to three transfer circuits 61-63, buffer register 59 to three transfer circuits 64-66, and buffer register 60 to three transfer circuits 67-69.

The reset sweep 45 automatically resets each of the sweep oscillators 11-13 after they have swept through the first four frequencies each time. When a signal is received by reset sweep 45 from the gate receiver 19, the reset sweep is de-activated and does not reset the sweep oscillators 11-13.

The identity signals are received and transmitted from the receiver 18 through the logic element 47. Logic element 47 does not pass on the identity signals until a signal is received from gate receiver 19. Upon receiving a signal from the gate receiver, the logic element 47 passes the identity signals to shift registers 52-54.

After the identity signals have been read into the shift registers 52-54, a signal from the logic element 47 applied to transfer elements 55-57 will transfer the information therein to the buffer registers 58-60. After all information has been shifted in the shift registers 52-57, the readout control applies a signal to transfer elements 61-69 in sequence for readout. The information stored in the shift registers 52-57 is read out in serial form one decimal bit at a time through decoder 73 and punched out by punch 71.

OPERATION

Signal repeating devices 20 are attached to the objects to be identified so that the signal repeating devices will pass through the radiation fields of the antennas 15, 16 and 17 as the object moves in a predetermined path.

Each signal repeating device is coded to a different identification number so that each signal repeating device is a unique identification device. The identification number is selected by the twelve piezoelectric elements connected in the signal repeating device 20 as described hereinbefore. The twelve piezoelectric elements are selected from the thirty-six different frequencies.

Sweep oscillators 11–13 generate signals starting at the upper end of their frequency range. Reset sweep 45 continually resets sweep oscillators 11–13 after they have swept through their first four frequencies. In this manner sweep oscillator 11 sweeps through the 480 kc. to 450 kc. frequencies and then is reset to start its sweep again.

The variable frequency signals produced by sweep oscillators 11–13 are amplified by amplifier 14 and transmitted by transmitting antenna 15. As soon as a signal repeating device 20 enters the field of the receiving antenna 16, one or more signals are received at the first four frequencies produced by sweep oscillators 11–13 depending on the particular piezoelectric elements connected in that specific signal repeating device 20. The signals received by receiving antenna 16 are applied by receiver 18 to logic element 47. The logic element 47 is inhibited from passing the signals from receiver 18 this time.

Clocks 41–43 produce signals synchronized with the frequencies shown hereinbefore as produced by sweep oscillators 11–13. The clock signals produced by clocks 41–43 are inhibited by gate 51.

When an object moves so that the attached signal repeating device 20 enters the field of receiving antenna 17, one or more signals are received at the first four frequencies produced by sweep oscillator 11, depending on the particular piezoelectric elements connected in that particular signal repeating device. The signals re-received by receiving antenna 17 are applied to the gate receiver 19. Gate receiver 19 applies a gate signal to reset sweep 45 and logic element 47. The reset sweep 45 resets the sweep oscillators 11–13 and is then turned off so oscillators 11–13 can sweep through their whole frequency range. Logic element 47 is enabled so that signals applied to the logic element 47 from receiver 18 will be passed by the logic element 47 and the logic element 47 applies a signal to gate 51 to open the gate 51.

The turning off of the reset sweep 45 by the gate receiver 19 and the enabling of the logic element 47 by the gate receiver 19 indicates that a signal repeating device 20 is well within the field of the receiving antenna 16. The sweeping of the first four frequencies and then resetting the sweep oscillators to begin a new sweep until a signal repeating device is within the field of the receiving antenna 16 permits the use of a shorter antenna than would be required to sweep the whole frequency range seeking the presence of a signal repeating device.

The variable frequency signals produced by sweep oscillators 11–13 are amplified by amplifier 14 and transmitted from transmitting antenna 15. At the frequencies of the piezo-electric elements connected to pickup antenna in signal repeating device 20, the transmitting antenna 15 and the receiving antenna 16 are coupled to apply signals to receiver 18. Receiver 18 produces output pulses at the frequencies of the piezoelectric elements connected in signal repeating device 20 and applies these pulses to logic element 47. The logic element 47 passes the signals from the receiver 19 to the inputs of shift registers 52–54. The signals from the clocks 41–43 shift the identification code in the shift register 52–54.

After the identification code has been stored in shift registers 52–54, a signal from logic 47 is applied to transfer elements 55–57 to transfer the identification code from the shift registers 52–54 to buffer registers 58–60. After the identification code has been transferred to the buffer registers 58–60, the readout control 49 responds to a signal from the logic element 47 to control the sequential readout of the identification code by applying sequential signals to transfer elements 61–69. The identification code is decoded in decoder 73 and punched out by a punch 71.

SYMBOLS AND NOMENCLATURE

In the following detailed description, the term "one signal" when used refers to a —6 volt signal and the term "zero signal" refers to a 0 volt signal or ground potential.

The symbols used in FIGS. 6a through 6l and described hereinafter are used in the detailed description of the identification system.

In all of the elements shown, input terminals are usually shown on the left side of the symbols and output terminals are shown on the right side of the symbols.

Amplifier

FIG. 6a shows the symbol for the amplifier. A one signal on the input terminal will cause current to flow in a load connected between the output terminal and the negative power bus.

Logic Amplifier

FIG. 6b shows the symbol for the logic amplifier or inverter amplifier. The signal applied to the input terminal is inverted and produced on the output terminal after amplification.

AND/NOT circuit

FIG. 6c shows the symbol for the AND/NOT circuit. Its operation is such that a zero signal on all input terminals causes a one signal to be produced on the output terminal. This unit may have two or more input terminals. Positive pulses received on all terminals are effectively the same as zero signals received and cause a one signal to be produced on the output terminal. If a one signal is applied to one or more input terminals, a zero signal is produced on the output terminal.

Counter

FIG. 6d shows the symbol for a counter bit. A one signal applied to the SET terminal sets the counter bit to one, so that a one signal appears at the "1" output terminal and a zero signal at the "0" terminal. This one signal at the "1" output terminal will be maintained after the set signal is removed and remains until a one signal is applied to the RST (reset) terminal, at which time the one signal at the "1" output terminal becomes a zero signal; and a one signal appears at the "0" output terminal. The counter bit will remain in this, the zero state or reset state, until a one signal is again applied to the SET terminal. In addition, a positive pulse received on the PUL input terminal will complement the counter bit, changing the state of the counter bit from the previous state. The shift of the counter bit will occur on the positive going side of the input pulse. The "1" and "0" output terminals are always the inverse of each other unless a one signal is simultaneously applied to the SET and RST (reset) terminal, in which case, a zero output signal will be present on both output terminals.

Inverter

FIG. 6e shows the basic symbol for the inverter. A one signal is produced on the output terminal if a zero signal is received on the input terminal and a zero signal is produced on the output terminal if a one signal is received on the input terminal. The small circle is added to the output terminal to indicate the inverted output signal.

Inverting "OR" circuit

FIG. 6f shows the symbol for the inverting OR circuit. Its operation is such that one or more one signals applied to the input terminals will cause a zero signal to be produced on its output terminal. The small circle is added to the output terminal to indicate the inverted output signal.

One shot pulse generator

FIG. 6g shows the symbol for one shot pulse generator. A negative going pulse or a negative going step change in a D.C. input to the upper input terminal, or a positive going pulse or a positive going step change in a D.C. input to the lower input terminal, will cause a pulse to be produced at the upper output terminal with a negative going leading edge and a pulse to be produced at the lower output terminal with a positive going leading edge. Both output pulses are available at the same time with a signal on either or both input terminals. The length in time of the output pulses may be adjusted by the capacitance of a capacitor connected to the one shot pulse generator.

"OR" circuit

FIG. 6h shows a symbol for an OR circuit. Its operation is such that a one signal on either input terminal will produce a one signal on the output terminal. This symbol may have two or more input terminals.

Shift register

FIG. 6i shows a symbol for a shift register bit. This circuit is similar to the counter bit shown in FIG. 6d and described above, except for the provision of the ST1 (steer 1) and the ST0 (steer 0) terminals. If a one signal is applied to the SET terminal, the shift register bit is set to one; and a one signal will appear at the "1" output terminal. This one signal will remain after the set signal is removed, with the shift register bit remaining set to one until it is reset. A one signal applied to the RST (reset) terminal will reset the shift register bit to zero, and a one signal will appear at the "0" output terminal. The shift register bit will remain reset until it is set to one again. If one signals are received simultaneously on both the RST and the SET terminals, a zero output signal will be present on both output terminals. In addition, if a one signal is applied to the ST1 (steer 1) terminal, a zero signal to the ST0 terminal and a positive pulse applied to the PUL terminal, the shift register bit will be set to one with a one signal appearing on the "1" output terminal. If a one signal is applied to the ST0 (steer 0) terminal, a zero signal to the ST1 terminal and a pulse applied to the PUL terminal, the shift register will be reset to zero with a one signal appearing on the "0" output terminal. The shift of signals from terminal to terminal occurs on the positive going side of the positive pulse applied to the PUL input terminal. The "1" and "0" output terminals are always the inverse of each other, unless a one signal is simultaneously applied to the ST1 and the ST0 terminals, in which case the output remains as it was before.

Flip-flop

FIG. 6j shows the symbol for the flip-flop element. If a signal is applied to terminal F or H (the set terminals), the flip-flop will be set to 1 with a signal appearing at terminal E. This signal will be maintained after the set signal is removed with the flip-flop remaining set at 1. The unit will remain in this state until a signal is applied to terminals J or K (the reset terminals) at which time the signal on terminal E is removed and the flip-flop is reset to zero and a signal appears on terminal L. The unit will remain in this state until a signal is applied. If the set and reset signals are applied simultaneously, both E and L signals will be removed and no signal will appear on the output terminals.

Time delay

FIG. 6k shows the symbol for a time delay element. Its operation is such that a predetermined period of time after a one signal is removed from the input terminal, a one signal will appear on the output terminal.

Relay coil

FIG. 6l shows the symbol used for a coil of a relay. The relay coil is energized by applying a one signal to the coil.

DETAILED DESCRIPTION

Referring now to FIG. 4, after the previous identification code has been read, a one signal is applied to terminal M of one shot 101 causing a one signal to be produced on terminal E which is applied to terminal X of one shot 103. When the one signal goes to zero, one shot 103 produces a one signal on terminal P which is applied to terminal M of one shot 105. When the one signal from terminal P goes to zero, one shot 105 applies a one signal on output terminal 107 to the three sweep oscillators 11-13 in FIG. 1 to reset the sweep oscillator.

Resetting is carried out on the negative going side of the one signal from terminal E of one shot 105. One shot 105 produces a zero signal from its terminal L at the same time which is applied to terminal M of AND/NOT circuit 109. At this time, a zero signal is also applied to terminal N of AND/NOT circuit 109. AND/NOT circuit 109 then applies a one signal to terminal M of one shot 101 so that when the zero signal from terminal L of one shot 105 goes negative, a one signal is applied to terminal M of AND/NOT 109. The one signal from terminal L of AND/NOT 109 then goes positive causing one shot 101 to apply a one signal from terminal E to terminal X of one shot 103. One shot 103 then produces a one signal on the positive going side of the one signal applied to terminal X which is applied to terminal M of one shot 105 causing one shot 105 to produce another one signal from terminal E to reset the sweep oscillators again. The timing of the signals from one shots 103, 105, and 101 is such that a reset pulse is produced from output terminal E of one shot 105 and delivered on output terminal 107 to reset the sweep after the sweep oscillator 11 has swept the first four frequencies from 480 kc. to 450 kc. Thus, the sweep is reset after it has swept four bits of the signal. Each of the three sweep oscillators 11-13 are reset but sweep oscillator 11 is the only one we are now concerned with.

The signals received from the short receiving antenna 17 and gate receiver 19 in FIG. 1 are applied to terminal 111 in FIG. 4. The input pulses received on input terminal 111 are applied to inverting delay circuit 113. Delay circuit 113 is a 50 microsecond delay circuit to insure that the signal received on input terminal 111 is at least 50 microseconds long. The zero signals are the significant signals indicating a binary one. The zero signals received on input terminal 111 are inverted to one signals by inverting delay circuit 113 and inverted back to a zero signal by inverter 115. The zero signals from inverter 115 are applied to terminel X of AND/NOT circuit 117. A zero signal is applied to terminal Y of AND/NOT circuit 117 at this time. With zero signals applied to both terminals of AND/NOT circuit 117, AND/NOT circuit 117 applies a one signal to the SET terminal of flip-flop 119 to set flip-flop to one. Flip-flop 119, set to one, applies a zero signal from output terminal W to terminal R of AND/NOT circuit 121 and a zero signal to terminal X of AND/NOT circuit 123. AND/NOT circuit 123 also has a zero signal applied to its Y input terminal at this time so it applies a one signal to the N terminal of AND/NOT circuit 109. AND/NOT circuit 109 with a one signal applied to its N terminal is inhibited from producing a one signal and can not apply a one signal to one shot 101. The next time that one shot 105 applies a zero signal to terminal M of AND/NOT 109, AND/NOT 109 does not apply a one signal to one shot 101; one shot 101 therefore does not apply a one signal to the input of one shot 103 and one shot 103 does not apply a one signal to terminal M of one shot 105. One shot 105 thereupon does not produce a one signal from its output terminal E, no sweep reset signal is delivered on output terminal 107 and the sweep oscillators 11–13 in FIG. 1 are not reset but continue on sweeping through the entire range of frequencies.

The inputs of the three frequency ranges from receiver 18 in FIG. 1 are received on input terminals 125, 126 and 127. The received signals are illustrated in the timing diagram in FIG. 2b. The input for the frequency range 630 kc. through 520 kc. is received on input terminal 125, the input for the frequency range 770 kc. through 660 kc. is received on input terminal 126 and the input for the frequency range from 480 kc. through 370 kc. is received on input terminal 127. The significant signals are zero signals, which are inverted to one signals and delayed by delay circuits 128–130, respectively. The delay circuits serve to make sure that a signal is at least 20 microseconds long before it is taken into consideration and thus eliminates a noise. The one signals from delay circuits 128–130 are inverted back to zero signals by inverters 131–133 and applied to AND/NOT circuits 135–137. The input to terminal 125 is applied to terminal H of AND/NOT circuit 135, the input to terminal 126 is applied to terminal T of AND/NOT circuit 136 and the input to terminal 127 is applied to terminal H of AND/NOT circuit 137.

When the output from terminal E of one shot 105 goes to zero, it applies a zero signal to terminal J of AND/NOT 135, a zero signal to terminal U of AND/NOT circuit 136 and a zero signal to terminal J of AND/NOT circuit 137.

When flip-flop 119 was set to one, it applied a zero signal to terminal R of AND/NOT circuit 121. Terminal T of AND/NOT 121 had a zero signal applied thereto from output terminal L of one shot 105 at the last reset pulse.

The zero signal received from gate receiver 19 in FIG. 1 on input terminal 111, after delay and inversion to a one signal by delay circuit 113, is applied to one shot 175 causing one shot 175 to produce a one signal from its output terminal P which is delayed and inverted to a zero signal by delay circuit 177 and applied as a zero signal to terminal X of AND/NOT circuit 179. AND/NOT circuit 179 has a one signal applied to the Y terminal at this time so that AND/NOT circuit 179 applies a zero signal to terminal F of inverting OR circuit 181 and a zero signal to terminal V of AND/NOT circuit 121. A zero signal is applied to terminal F of inverting OR circuit 181 and as terminal K of inverting OR circuit 181 also has a zero signal applied thereto at this time. Inverting OR 181 applies a one signal continually to AND/NOT circuit 179. This keeps AND/NOT circuit 179 producing a zero signal.

For the purposes of this immediate description, assume that terminal U of AND/NOT circuit 121 has zero signals applied thereto at this time causing AND/NOT circuit 121 to apply a one signal to the set input terminal of flip-flop 139 to set that flip-flop to one. Flip-flop 139 when set to one applies a zero signal to terminal F of AND/NOT circuit 135, a zero signal to terminal R of AND/NOT circuit 136 and a zero signal to terminal F of AND/NOT circuit 137.

Flip-flop 139 set to one also applies a zero signal from its zero output terminal W to terminal Y of AND/NOT 141, terminal N of AND/NOT circuit 143 and terminal H of AND/NOT circuit 145. This lets through the clock pulses in a manner to be explained.

The zero signals received on terminals 125–127 are applied after a delay and inversion to AND/NOT circuits 135–137 as zero signals. As described hereinbefore, the other terminals of these AND/NOT circuits 135–137 have zero signals applied to the other terminals thereof. AND/NOT circuits 135–137 produce one signals which are delivered on output termials 146–148 in response to the receipt of zero signals on the input terminals 125–127. The one output signals on output terminals 146–147 are applied to the set input terminals of the first shift register bits in shift registers 52–54 in FIG. 1 to set the first shift register bit in each shift register to one. The set signals are illustrated in FIG. 2a. A shift register is described in more detail with respect to FIG. 5.

Clock pulses are received on input terminals 154–156 in FIG. 4 from the three clocks 41–43 in FIG. 1. These clock pulses are one signals received as indicated in the timing diagram in FIG. 2d at the same time as received signals will be received on input terminals 125–127. These clock pulses are applied to one shots 157–159 to cause one shots 157–159 to produce zero signals from their output terminals. The zero signals are applied to AND/NOT circuits 141, 143 and 145. The output from terminal L of one shot 159 is applied to terminal X of AND/NOT 141, the output from terminal L of one shot 158 is applied to terminal M of AND/NOT 143, and the zero output signal from terminal W of one shot 157 is applied to terminal F of one shot 145. It should be noted that the one shots 157–159 produce zero output signals on the zero going side of the clock pulses so that the zero outputs from one shots 157–159 are delayed the width of the input clock pulses. Zero signals are applied to the other terminals of AND/NOT circuits 141, 143 and 145 as explained hereinbefore so that when zero signals are applied from the one shots to AND/NOT circuits 141, 143 and 145, AND/NOT circuits 141, 143 and 145 produce one signals which are inverted to zero signals by inverting circuits 161–163, inverted back to one signals by inverting amplifiers 165–167 and applied as one signals to the shift inputs of shift registers 52–54 on output terminals 171–173 shown in FIG. 2 of the timing diagram.

The identification number is then read into the shift registers 52–54 in a manner which will be described specifically with respect to the internal operation of a shift register shown in FIG. 5. The first bit of the shift registers is sequentially set and then shifted until all twelve identification digits have been read into each of the shift registers.

At the end of the sweep of the frequencies by each of the three sweep generators, a one signal is received as a synchronization pulse on input terminal 183. The zero signal received from gate receiver 19 in FIG. 1 on terminal 111 stops as the signal repeating device has left the short antenna so that a one signal is applied to terminal X of AND/NOT circuit 117. AND/NOT circuit 117 then applies a zero signal to the SET terminal of flip-flop 119. The synchronism one signal received on input terminal 183, after passing through OR circuit 185, is applied to the RESET terminal of flip-flop 119 to reset that flip-flop to zero and also applied to the RESET terminal of flip-flop 139 to reset that flip-flop to zero. The one signal from terminal 183 is also applied to terminal K of inverting OR 181 causing inverting OR 181 to produce a zero signal which is applied to terminal Y of AND/NOT circuit 179 causing AND/NOT circuit 179 to produce a one signal which is applied to terminal F of inverting OR circuit 181. Inverting OR 181 thus keeps producing a zero signal. AND/NOT circuit 179 also applies a one signal to terminal V of AND/NOT circuit 121 and a one signal to terminal Y of AND/NOT circuit 123.

AND/NOT circuit 121 with a one signal aplied to terminal V applies a zero signal to the SET input of flip-flop 139. AND/NOT 123 with a one signal applied to its Y terminal applies a zero signal to terminal N of AND/NOT circuit 109 so that the sweep reset one shots 103, 105 and 101 can continue resetting the sweep after the sweep of the first four binary digits as hereinbefore described.

Flip-flops 119 and 139 have been reset to zero so that flip-flop 119 applies a one signal to terminal R of AND/NOT circuit 121 and flip-flop 139 applies a one signal to terminal H of AND/NOT circuit 145, terminal N of AND/NOT circuit 143, terminal Y of AND/NOT circuit 141, terminal F of AND/NOT circuit 135, terminal R of AND/NOT circuit 136 and terminal F of AND/NOT circuit 137. This inhibits the AND/NOT circuits 143, 141, 145, 135, 136 and 137 from passing clock pulses and any received input signals.

The synchronization one signal received on terminal 183 on its zero going side causes one shot 185 to produce a one signal from output terminal P to set flip-flop 187 to one. Flip-flop 187 set to one applies a zero signal to terminal U of AND/NOT circuit 189 and a zero signal to terminal M of AND/NOT circuit 191. For the purposes of the immediate description, assume that a zero signal is applied to terminal V of AND/NOT 189. AND/NOT 189 therefore produces a one signal which on its negative going side causes one shot 193 to produce a zero signal from output terminal L which is inverted and amplified by inverting amplifier 195 to a one signal and applied on output terminal 197 to all of the buffer registers 58-60 in FIG. 1 to reset the buffer registers 58-60 to zero.

The one signal from output terminal E of one shot 193 in FIG. 4 is applied to one shot 203 causing one shot 203 on the positive going side of the one signal to produce a one signal which is inverted and amplified by inverting amplifier 205 and delivered on output terminal 207 to transfer elements 55-57 in FIG. 1 to transfer the identification information therein from shift registers 52-54 to the buffer registers. The one signal from one shot 203 on its positive going side causes one shot 209 to produce a zero pulse on output terminal L which is amplified and inverted to a one signal by inverting amplifier 211 and delivered on output terminal 213 to shift registers 52-54 to reset all of the shift register bits therein to zero. The one signal from one shot 203 is also applied to terminal M of AND/NOT circuit 217 and also applied to the RESET terminal of flip-flop 187 to reset that flip-flop to zero so that flip-flop 187 applies a one signal to terminal N of AND/NOT 191 and a one signal to terminal U of AND/NOT 189.

As soon as the one signal from one shot 203 goes to zero, a zero signal is applied to terminal M of AND/NOT 217, causing AND/NOT 217 to produce a one signal which causes one shot 219 on the negative going side of the signal to produce a one and a zero signal from its output terminals. The one signal from output terminal P of one shot 219 is inverted and delayed by delay circuit 221 to a longer zero signal, inverted back to a one signal by inverter 223 and applied as a one signal to terminal V of AND/NOT 189. This prevents AND/NOT 189 from producing a further one signal at this time to prevent one shot 193 from resetting or setting any of the buffer registers until after the number therein is punched out in a manner to be described. The one signal from terminal P of one shot 219 is also applied and amplified by amplifier 221 to energize relay coil 223 to energize the clutch to punch out the first digit of the identification number. The number to be punched out is selected and decoded in a manner to be referred to later.

The one signal from terminal P of one shot 219 is also applied to terminal M of AND/NOT circuit 225 causing the AND/NOT circuit 225 to apply a zero signal to terminal F of decoder 227 and terminal F of decoder 229. A zero signal applied to terminal F of decoder 227 and terminal F of decoder 229 opens these decoders so that they will decode the number presented to them from readout counter 231.

Readout counter 231 consists of counter bits 232, 233, 234 and 235. The one signal from one shot 219 is also applied to the PUL input terminal J of counter bit 232 causing that counter bit to be conplemented to one registering a count of one in the readout counter 231. The one and zero outputs of readout counter 231 are applied to decoders 227 and 229 to decode the binary number resting in the readout counter 231 to a one out of nine output. The nine outputs from decoders 227 and 229 are one signals which are inverted by inverters 241-249 to zero signals, amplified by amplifiers 251-259 and delivered on output terminals 261-269 to transfer elements 61-69 to select on out of the nine digits of information stored therein to be read out.

The clutch punch is activated as described hereinbefore to punch out the first digit of the identification number. The counter is then stepped forward one to select the next decimal number to be read out.

The zero signal from terminal W of one shot 219 produced at the same time that the one signal is produced is applied to terminal F of one shot 271 causing one shot 271 on the one going side of the zero signal to produce a zero signal from terminal L which is applied to terminal X of AND/NOT circuit 273. Terminal Y of AND/NOT circuit 273 has a zero signal applied thereto at this time also from AND/NOT circuit 275 for reasons which will be described. The zero output terminal L of counter bit 232 is applied to terminal F of AND/NOT 275, the one output terminal P of counter bit 233 is applied to terminal H of AND/NOT circuit 275, the one output terminal E of counter bit 234 is applied to terminal J of AND/NOT circuit 275 and the zero output terminal W of counter bit 235 is applied to terminal K of AND/NOT circuit 275. When all of these outputs are zero and applied to AND/NOT 275, the output of AND/NOT 275 will be a one signal. This is the occasion when readout counter 231 is counted to nine and has read out all of the numbers in the buffer registers 58-60 in FIG. 1. As long as the readout counter 231 is counting between zero and nine, a one signal is applied to at least one of the terminals of AND/NOT circuit 275 causing AND/NOT circuit 275 to apply a zero signal to AND/NOT 273.

AND/NOT 273 therefore produces a one signal upon the application of a zero signal from terminal L of one shot 271, the one signal from AND/NOT 273 being applied to terminal X of one shot 219. Upon the positive going side of the one signal produced by AND/NOT 273, one shot 219 again produces one and zero signals as hereinbefore described to cause the readout counter 231 to count a further count of one and causing the punch clutch to be activated to punch out another number as hereinbefore described. The zero signal from terminal W of one shot 219 is again applied to one shot 271 as hereinbefore described to cause AND/NOT 273 to again activate one shot 219. This continues until readout counter 231 has counted to nine whereupon, as hereinbefore described, zero signals are applied to all of the terminals of AND/NOT 275 causing AND/NOT 275 to apply a one signal to terminal Y of AND/NOT 273. AND/NOT 273 cannot therefore produce any further one signals and one shot 219 is de-activated. The one signal produced by AND/NOT 275 is also inverted by inverter 277 and applied as a zero signal to terminal H of AND/NOT 279. As one shot 271 is no longer producing a one signal, one shot 271 applies a zero signal to terminal F of AND/NOT 279. One shot 219 applies a zero signal to terminal J of AND/NOT 279 at the same time as one shot 271 applies a zero signal to terminal F so that zero signals are applied to all of the terminals of one shot or AND/NOT 279 causing AND/NOT 279 to produce a one signal which is inverted by inverter 281 to a zero signal and applied to terminal X of one shot 283.

The zero signal applied to terminal X of one shot 283 causes one shot 283 to produce a one signal which is applied to the punch clutch to cause a carriage return.

*Shift Register*

A four bit portion of one of the shift registers and associated buffer registers is shown in FIG. 5. This is a four bit portion that shows the shift register bits, the transfer circuits, the buffer registers and the transfer from the buffer register to the decoder for readout. The shift register consists of four shift register bits 301–304. Identification numbers are entered into this shift register serially by setting the first shift register bit 301 to one by applying a one signal and pulse on input terminal 305 if a binary one is to be entered into the shift register 301 or applying a zero signal to terminal 305. A binary zero is to be entered into shift register bit 301. A zero signal is applied continually to the steer 1 terminal and a —6 volt or one signal is applied continually to the steer 0 input terminal of shift register bit 301.

Because of the one signal continually applied to the steer 0 terminal, the last shift pulse applied to the PUL input terminal of shift register bit 301 caused shift register bit 301 to be steered to zero. Shift register bit 301 is therefore zero at the time that a one or zero signal is applied to the SET input terminal 305. If a one signal is applied to terminal 305, shift register bit 301 is set to one. If a zero signal is applied to terminal 305, shift register bit 301 remains reset to zero.

After shift register bit 301 has been set to one, or allowed to remain at zero, a shift signal is applied on terminal 307 to all of the PUL input terminals of shift register bits 301–304. The shift pulse is a significant time after the SET signal has been applied to terminal 305 as shown in the timing diagram in FIGS. 2a and 2c. Shift register bit 301 set to one applies a one output signal from its one output terminal to the steer 1 terminal of shift register bit 302 or if it is reset to zero applies a one signal to the ST0 or steer 0 terminal of shift register bit 302. The shift pulse applied to the PUL input terminal of shift register bit 301 causes shift register bit 301 to be reset to zero because of the one signal applied to the steer 0 terminal and causes shift register bit 302 to be either steered to one or steered to zero depending on which terminal a one signal has been applied to. This continues on until a four bit number has been serially shifted into shift register bits 301–304.

The identity number resting in shift register bits 301–304 is shifted to a buffer register consisting of four flip-flops 311–314 by the application of a zero signal to the transfer terminal 309. The zero terminals of shift register bits 301–304 are applied to terminals X of AND/NOT circuit 321–324. Thus, if a shift register bit is set to one, its zero terminal applies a zero signal to terminal X of the corresponding AND/NOT circuit. When a zero signal is applied to the transfer terminal 309 applying zero signals to terminals Y of AND/NOT circuits 321–324, AND/NOT circuits 321–324 produce one signals from their output terminal if the corresponding shift register bits 301–304 is set to one. The one signal from the output terminals of AND/NOT circuits 321–324 set the corresponding flip-flops 311–314 to one. Flip-flops 311–314 set to one apply a one signal to transfer network 325. Transfer network 325 does not transfer the signals applied thereto until a one signal is applied to the read terminal 327. The read signal from input terminal 327 is applied from one of the selected terminals 261–269 in FIG. 4.

Shift register bits 301–304 are reset to zero by the application of a one signal on RESET input terminal 331. Flip-flops 311–314 are reset by the application of a one signal to RESET input terminal 333.

Multiplexer or transfer network 325 when activated by the application of a one signal on input terminal 327 produces a one output signal corresponding to the contents of flip-flops 311–314 on output terminals 341–344. Output terminals 341–344 are applied to the decoding network for decoding before punchout.

In summary, a new and improved identification interrogating system has been described. To accommodate a large number of identity bits, a plurality of signals are transmitted, simultaneously, each over a different frequency range.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An identification interrogation system comprising a signal repeating device associated with each object to be identified having a plurality of selectively connected piezoelectric elements, each of a different preselected frequency response, and means for interrogating said signal repeating device with a plurality of signals having different frequency ranges covering the frequency range of said signal repeating devices each of the different frequency ranges of said plurality of signals being a division of the frequency range of said signal repeating devices to obtain a response of frequency identified signals.

2. An identification interrogation system comprising a signal repeating device associated with each object to be identified having a plurality of selectively connected piezoelectric elements, each of a different preselected frequency response, means for interrogating said signal repeating device with a plurality of signals having different frequency ranges covering the frequency range of said signal repeating devices each of the different frequency ranges of said plurality of signals being a division of the frequency range of said signal repeating devices, and means for receiving reflected frequency identified signals from said signal repeating device.

3. An identification interrogation system comprising a signal repeating device associated with each object to be identified having a plurality of selectively connected piezoelectric elements, each of a different preselected frequency response, means for interrogating said signal repeating device with a plurality of signals having different frequency ranges covering the frequency range of said signal repeating devices each of the different frequency ranges of said plurality of signals being a division of the frequency range of said signal repeating devices, means for receiving reflected frequency identified signals from said signal repeating device, and a plurality of means for storing said plurality of signals according to their frequency range.

4. An identification interrogation system comprising a signal repeating device associated with each object to be identified having a plurality of selectively connected piezoelectric elements, each of a different preselected frequency response, means for interrogating said signal repeating device with a plurality of signals having different frequency ranges covering the frequency range of said signal repeating device each of the different frequency ranges of said plurality of signals being a division of the frequency range of said signal repeating devices, means responsive to said interrogation means for providing timing signals in synchronism with the production of interrogation signals, means for receiving reflected frequency identified signals from said signal repeating device, and means for storing said received frequency identified signals under the control of said timing signals.

5. An identification interrogation system comprising a signal repeating device associated with each object to be identified having a plurality of selectively connected piezoelectric elements, each of a different preselected frequency response, means for interrogating said signal repeating device with a plurality of signals having different frequency ranges covering the frequency range of said signal repeating device each of the different frequency ranges of said plurality of signals being a division of the frequency range of said signal repeating devices, a plurality of means responsive to said interrogation means for providing timing signals in synchronism with the production of said plurality of interrogation signals, means for receiving reflected frequency identified signals from said signal repeating device, means for storing said received frequency identified signals under the control of said timing signals, buffer storage means, and means responsive to the storage of said frequency identified signals in said storage means for transferring said frequency identified signals to said buffer storage means.

6. An identification interrogation system comprising a signal repeating device associated with each object to be identified having a plurality of selectively connected piezoelectric elements, each of a different preselected frequency response, means for interrogating said signal repeating device with a plurality of signals having different frequency ranges covering the frequency range of said signal repeating device each of the different frequency ranges of said plurality of signals being a division of the frequency range of said signal repeating devices, a plurality of means responsive to said interrogation means for providing timing signals in synchronism with the production of said plurality of interrogation signals, means for receiving reflected frequency identified signals from said signal repeating device, means for storing said received frequency identified signals under the control of said timing signals, buffer storage means, means responsive to the storage of said frequency identified signals in said storage means for transferring said frequency identified signals to said buffer storage means, and means responsive to the transfer of said frequency identification signals to said buffer storage means for controlling the readout of said frequency identified signals.

7. An identification interrogation system comprising a signal repeating device associated with each object to be identified having a plurality of selectively connected piezoelectric elements, each of a different preselected frequency response, means for interrogating said signal repeating device with a plurality of signals having different frequency ranges covering the frequency range of said signal repeating device each of the different frequency ranges of said plurality of signals being a division of the frequency range of said signal repeating devices, a plurality of means responsive to said interrogation means for providing timing signals in synchronism with the production of said plurality of interrogation signals, means for receiving reflected frequency identified signals from said signal repeating device, means for storing said received frequency identified signals under the control of said timing signals, buffer storage means, means responsive to the storage of said frequency identified signals in said storage means for transferring said frequency identified signals to said buffer storage means, means responsive to the transfer of said frequency identification signals to said buffer storage means for initiating the readout of said frequency identification signals, means for counting the frequency identification signals as they are read out, and means responsive to the readout of a predetermined number of frequency signals as indicated by said counting means for indicating the end of readout.

References Cited by the Examiner
UNITED STATES PATENTS

| | | | |
|---|---|---|---|
| 2,814,032 | 11/57 | Agnew et al. | 340—258 |
| 3,090,042 | 5/63 | Kleist et al. | 343—6.5 |
| 3,092,829 | 6/63 | Kleist | 343—6.5 |

CHESTER L. JUSTUS, *Primary Examiner.*